T. F. WALL.
METHOD OF OBTAINING SPARKLESS BREAKS OF ELECTRIC CIRCUITS.
APPLICATION FILED APR. 19, 1916.

1,315,886.

Patented Sept. 9, 1919.

INVENTOR
Thomas Frederick Wall
BY
ATTORNEYS

T. F. WALL.
METHOD OF OBTAINING SPARKLESS BREAKS OF ELECTRIC CIRCUITS.
APPLICATION FILED APR. 19, 1916.

1,315,886.

Patented Sept. 9, 1919.
2 SHEETS—SHEET 2.

INVENTOR
Thomas Frederick Wall
BY
ATTORNEYS

UNITED STATES PATENT OFFICE.

THOMAS FREDERICK WALL, OF EDGBASTON, BIRMINGHAM, ENGLAND.

METHOD OF OBTAINING SPARKLESS BREAKS OF ELECTRIC CIRCUITS.

1,315,886.     Specification of Letters Patent.     Patented Sept. 9, 1919.

Application filed April 19, 1916. Serial No. 92,275.

*To all whom it may concern:*

Be it known that I, THOMAS FREDERICK WALL, subject of the King of Great Britain and Ireland, residing at 124 Poplar avenue, Edgbaston, Birmingham, England, lecturer in electrical engineering at the University of Birmingham, have invented a certain new and useful Method and Means of Obtaining Sparkless Breaks of Electric Circuits, of which the following is a specification.

Figure 1:
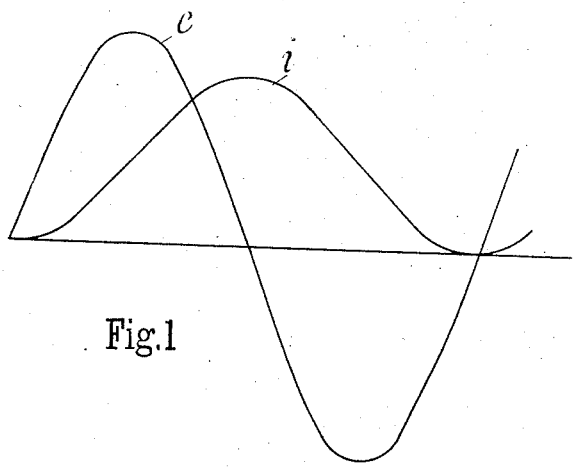

It is well known that if a resistanceless inductive circuit be supplied by a symmetrical alternating P. D. and the circuit be closed at the instant at which the P. D. passes through its zero value the current in the circuit will attain its maximum value when the P. D. wave has passed through half a cycle, and the current will sink to zero when the P. D. wave has passed through one cycle. The result is accordingly that the P. D. and current wave pass simultaneously through their zero values, and consequently if the circuit were opened at this instant no spark would be produced. Moreover, since the current curve is flat in the neighborhood of its zero values there would be little danger of a spark being produced if the break did not take place precisely at the correct instant. The relationship between pressure and current in the cycle under the above mentioned conditions is illustrated at Figure 1, where $e$ denotes the pressure curve and $i$ the current curve. As the calculation of the curves is based on the assumption that the circuit is without resistance, the current curve represents a hypothetical case.

Figure 2:
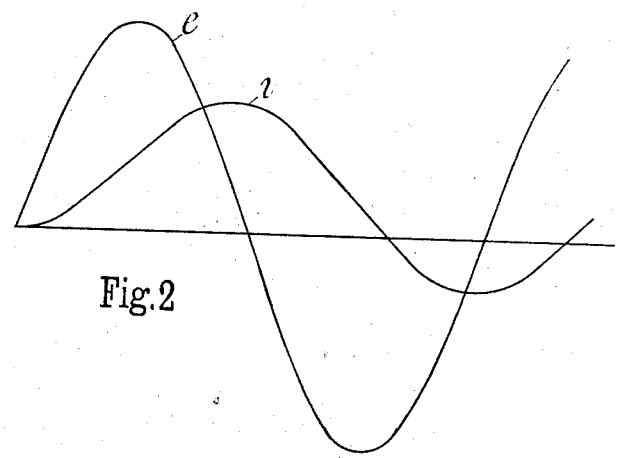

In practice it is impossible to obtain inductive coils of which the resistance is zero and the result is that although the circuit be closed at the instant at which the P. D. is zero the current does not again become zero at the completion of the cycle. Consequently sparkless breaking cannot be obtained. This condition is illustrated at Fig. 2, where as before $e$ denotes the pressure curve and $i$ the current curve. It will be observed that toward the end of the cycle the current curve falls below the zero line due to the resistance.

It has been proposed to make use of the above known relationship as represented by Fig. 2 in the operation of percussive tools by alternating currents, but it is evident from Fig. 2 that as the pressure and current do not reach the zero value concurrently a sparkless break is impossible.

The object of this invention is to provide a method and a means whereby the above mentioned objectionable effect of resistance may be obviated.

Figure 3:
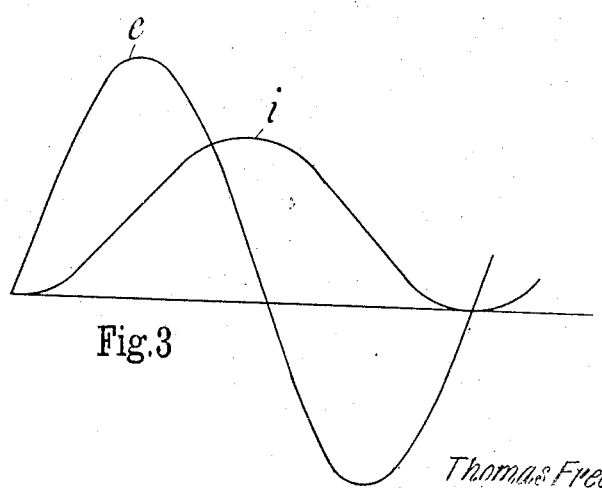

In one convenient manner of carrying the invention into effect, a suitable source of continuous current E. M. F. such as a secondary battery or a suitable continuous current generator is connected in series with the source of alternating E. M. F. and with the inductive circuit. The result is that the inductive circuit receives a P. D. which is the resultant of the alternating current pressure and the continuous current pressure. This will clearly give a pressure wave in which the maximum values in one direction will be greater than the maximum values in the opposite direction. By suitably adjusting the magnitude of the continuous current component of the pressure applied to the inductive circuit the effect of the resistance of the inductive circuit can be compensated so that if the circuit be closed when the pressure is zero the current sinks to zero again at the instant at which the pressure is passing through one of its zero values. This condition is then favorable for opening the circuit. The opening and closing of the circuit at the right instant may, of course, be performed by means of a suitable contact maker. A calculated example of the relationship obtained by the addition of a constant P. D. to an alternating P. D. is shown at Fig. 3 where $e$ denotes the pressure and $i$ the current. The alternating component of the P. D. for this example is assumed to be a sine wave. It will be noticed that there is absolute coincidence of the pressure and current zero values at the end of the cycle, and in consequence sparkless breaking at that instant can be obtained. Owing to the fact that the current curve is flat when it approaches the zero value breaking can be obtained with negligible sparking over a fairly wide time interval before or after the instant of coincidence. Oscillographic tests on actual apparatus prove that the required coincidence of the zero values is obtained by suitably adjusting the added P. D., and it is found that by properly setting the contact breaker sparking is eliminated.

Figure 4:
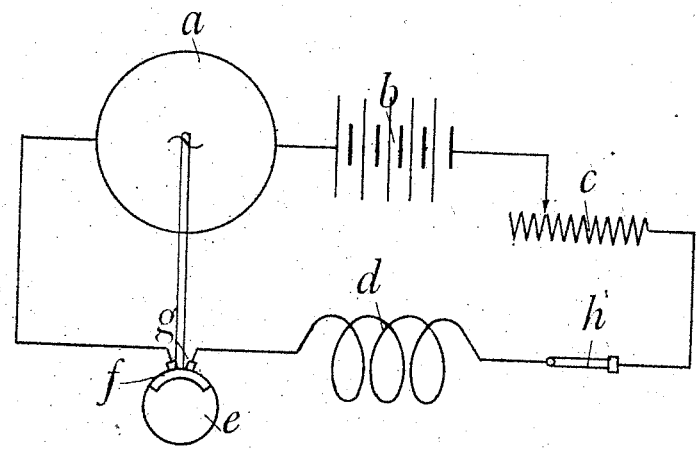

A convenient arrangement of apparatus embodying this invention is shown at Fig. 4. The alternator is represented by $a$. In series with this is a secondary battery $b$, a variable non-inductive resistance $c$ for adjusting circuit conditions, and the inductive coil $d$. An insulated disk $e$ driven by the alternator shaft or in any other convenient way synchronously with the alternator carries a metal contact segment $f$ and a pair of brushes $g$. The length of the segment is such that the brushes may be set to make and break the circuit at the correct instants. A switch is indicated by $h$. Instead of a battery or a direct current generator there may be used for producing the compensating E. M. F. a second alternator so constructed and connected to the inductive circuit that it injects an E. M. F. which will cause the zero value of the current to coincide with the zero value of the resultant pressure.

From the foregoing it is evident that for successfully utilizing in practice the pressure and current phenomena above described after closing an inductive circuit and enabling sparkless breaking to be obtained, it is necessary to produce an asymmetrical pressure wave in order to obtain the necessary coincidence of the pressure and current zero values. By an asymmetrical wave, I mean one in which the maximum value attained by the pressure on one side of the zero line is greater than that attained on the opposite side, or one in which the areas of the two parts of the wave are unequal.

It is not essential to this invention that the circuit shall be closed at the zero value of the P. D. as even in this case the current and pressure can be caused to reach their zero values simultaneously by suitable adjustment.

Figure 5:
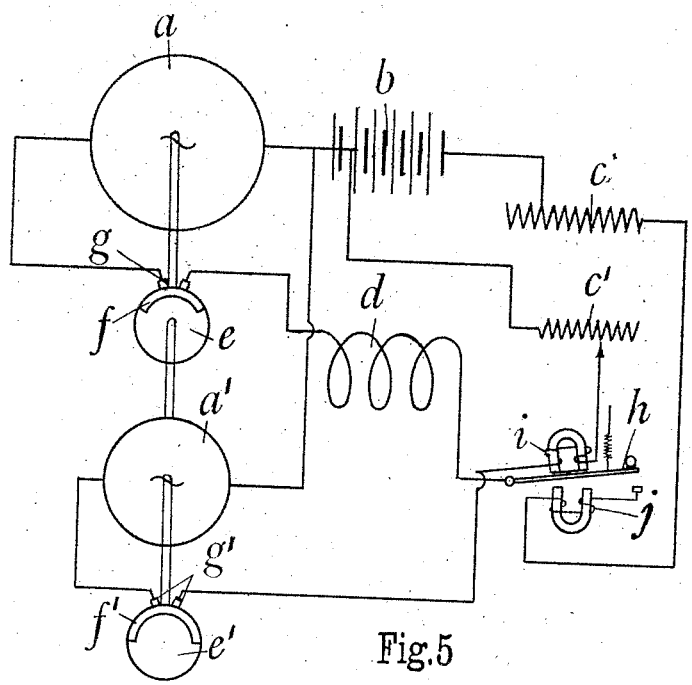

A practical application of the invention is found in high speed reciprocatory apparatus which is electrically operated, such as a chipping, riveting, or calking hammer, a rock drill and the like. The invention is also applicable to cases in which it is required to control an inductive circuit by a hand switch. In order that the switch may be actuated only at the right intervals means are necessary for controlling the switch. One convenient arrangement is shown at Fig. 5. The parts which have already been described are lettered as in Fig. 4. In addition to the contact $f$ there is provided a hand switch $h$ which also forms the armature of a pair of magnets $i$ and $j$. The magnet $j$ is in series with the inductive circuit and is adapted to hold the switch in the closed position after the circuit has been made until the circuit is interrupted by the contact $f$. The magnet $i$ is in series with the circuit of another and smaller generator $a'$ which is provided with a synchronously rotated disk $e'$ carrying a segment $f'$ acting in conjunction with brushes $g'$. Both generators are rotated synchronously. A battery or a portion of the battery $b$ or any other source of suitable E. M. F. and a resistance $c'$ are arranged in series with the generator $a'$. In order that the circuit through $i$ may be excited both shortly before and shortly after the main circuit is made the segment $f'$ may be slightly longer than the segment $f$. For some purposes it may be sufficiently satisfactory to excite the magnet $i$ from the circuit of the generator $a$ and thus dispense with the generator $a'$ and segment and brushes associated therewith. By employing the magnets $i$ and $j$ the hand switch can only be closed and opened when no current is passing through the main circuit. Any other convenient control for the switch may be provided.

The invention is not limited to the arrangements or devices herein described, as these may be varied to meet different requirements. Further, the invention is not limited to the uses mentioned.

Having thus described my invention what I claim as new and desire to secure by Letters Patent is:—

The method of insuring a sparkless break in a circuit comprising an inductance and a source of alternating electromotive force in series therewith, which comprises closing the circuit when the alternating electromotive force is substantially zero, impressing an auxiliary uni-directional electromotive force thereon of such value as to cause the current to pass through zero at substantially the same time as the impressed electromotive force and interrupting the circuit at the time when both current and electromotive force are passing through zero.

In testimony whereof I have signed my name to this specification.

THOMAS FREDERICK WALL.